United States Patent [19]
Hirasawa et al.

[11] 3,910,427
[45] Oct. 7, 1975

[54] CONVEYANCE CONTROL APPARATUS AND METHOD

[75] Inventors: Kotaro Hirasawa; Nobuhiro Hamada; Yukio Kawamoto, all of Hitachi; Hikaru Nakayama, Tokyo; Shimbu Yamagata, Hitachi, all of Japan

[73] Assignee: Hitachi, Ltd., Japan

[22] Filed: July 31, 1973

[21] Appl. No.: 384,226

[30] Foreign Application Priority Data
Aug. 1, 1972 Japan.................................. 47-76442

[52] U.S. Cl. ............................... 214/16 R; 214/152
[51] Int. Cl. ............................................ B65g 65/30
[58] Field of Search ........... 214/16 B, 16.4 A, 16 R, 214/152; 186/1 B

[56] References Cited
UNITED STATES PATENTS
3,490,616   1/1970   Castaldi .......................... 214/16.4 A
3,734,310   5/1973   Miller ............................ 214/16.4 A

*Primary Examiner*—Robert G. Sheridan
*Attorney, Agent, or Firm*—Craig & Antonelli

[57] ABSTRACT

A method of controlling a conveyor system which conveys a plurality of articles from a plurality of storehouses in which the articles are carried from primary warehouses through a plurality of conveying routes. The method enables the storehouses to store a minimum amount of stock to provide a constant delivery in spite of disturbances such as an accident or routine inspection of the conveyor system by supplying, when disturbances occur, a signal from a disturbance considered stock vacancy time deciding device to a latest entry time deciding device and by supplying, when no disturbances occur, a signal from a stock vacancy time deciding device to the latest entry time deciding device.

9 Claims, 12 Drawing Figures

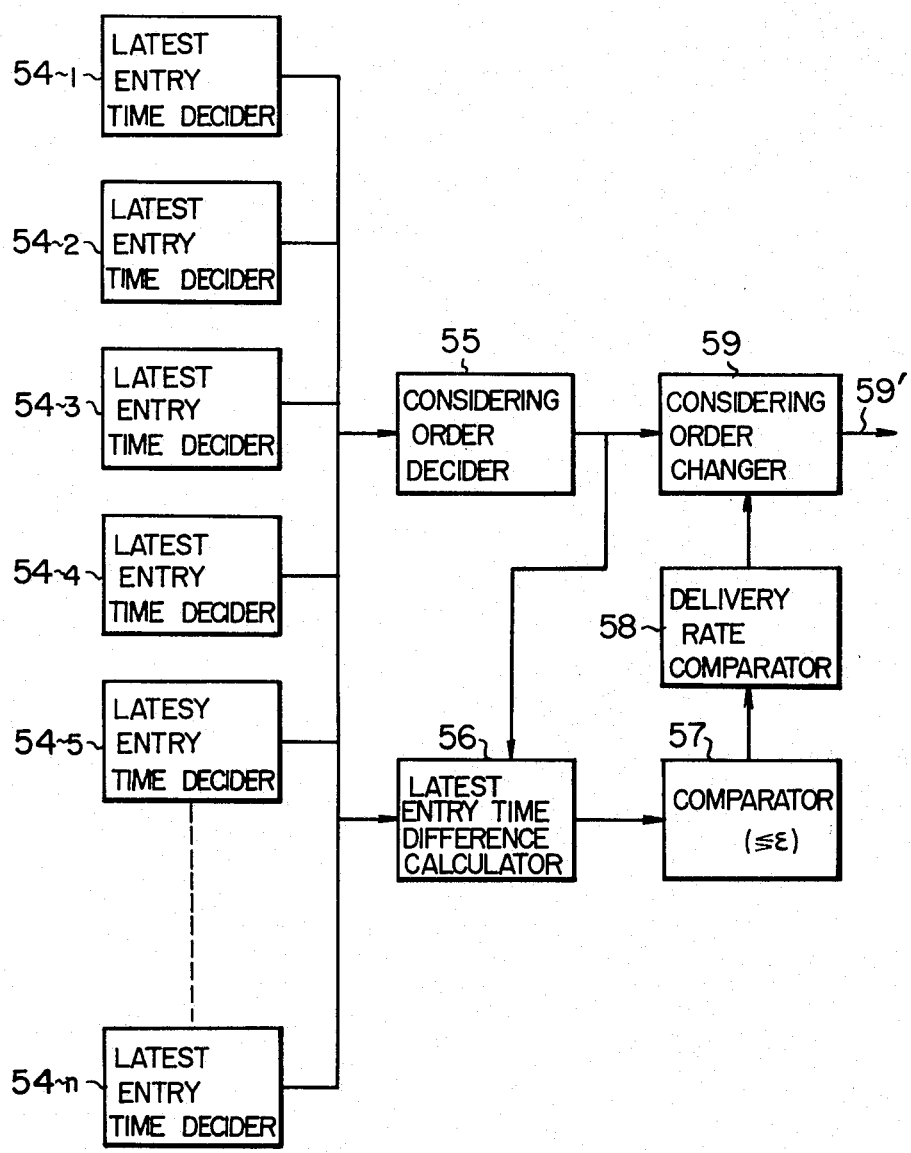
F I G. 5

CONVEYANCE CONTROL APPARATUS AND METHOD

The present invention relates to a method of controlling conveying contrivances in a multiconveyor system in which materials to be conveyed are carried by a feeder from a primary warehouse to the conveying contrivances such as conveyor belts to be conveyed to storehouses such that the storehouses never become vacant of stocks.

For operation of a blast furnace feeder system in an ironworks including belt conveyors in a raw-material yard, hoppers, and feeder for carrying materials of different properties such as iron ores from a primary warehouse, many automatic control equipments are employed. However, not a few parts of the control are yet being performed by experts. For example, the operation of storing beforehand raw materials in hoppers for preparation of stopping belt conveyors for routine inspection thereof, and the operation of belt conveyors and feeders in such a manner that the hoppers never become vacant of stocks by monitoring the stocks are yet dependent on the judgment of an operator.

Nevertheless, for a large scale raw material yard, the hoppers often happen to become vacant of stocks, and a suitable operation of the conveying contrivances has been difficult for the disturbances due to routine inspection of the system. Consequently, suitable automation of the system is necessary.

An object of the present invention is to provide a method of controlling conveyance of stocks in such a manner that the storehouses never become vacant of stocks for any change in the state of conveying contrivances and conveying routes.

Another object of the present invention is to determine the latest carrying-in or entry time of stocks for ensuring a sufficient total stock never for making storehouses vacant during the predetermined routine inspection which necessitates the stopping of conveying contricances.

A further object of the present invention is to provide a suitable method of conveying a plurality of kinds of articles considering the positions and conveying order of the articles when the articles are conveyed from a primary warehouse storing them.

In order to achieve the above first object the present invention is characterized by storing the order and restricting conditions of conveying operation and the starting time of conveyance in a conveying plan memory device, by forming a valuation function of the entire conveyor system from the contents of memory, and by modifying the conveying plan such that the valuation function is optimized.

In order to achieve the above second object the present invention is further characterized by determining the latest carrying-in or entry time to ensure a sufficient amount of stock so that a storehouse is prevented from becoming vacant of stock during the routine inspection thereof by taking the rate of carrying stock from and the rate of carrying stock in the storehouse and the time necessary for the routine inspection into consideration.

A further feature of the present invention is to modify the order of working or operation of conveying contrivances such that the amount of movement of the conveying contrivances is minimized within the range which meets the condition that the amount of stock of a storehouse is not reduced below the minimum amount of stock by considering the positions of a plurality of kinds of articles in a primary warehouse and the order or sequence of carrying the articles from the primary warehouses by the conveying contrivances.

The method according to the present invention which has the above features provides the following advantages:

1. In case a conveying contrivance cannot be used due to trouble or routine inspection thereof, the possibility of the stock vacant state of the storehouse associated with the route including the disturbed conveying contrivance can be prevented by increasing the amount of stock of the storehouse in question in advance.

2. The increase in the amount of stock can be effected by calculating the latest entry time with a simple procedure.

3. The possibility of the stock vacant state can be prevented by making earlier the considering sequence of the one having a larger delivery rate of two conveying operations of which the difference between the latest entry times is small.

4. The useless operation of the carrying device at a primary warehouse can be reduced by changing the consideration sequence of the conveying operations.

5 The formation of the fundamental plan of the conveying operation is quite effective to the minimization of the possibility of stock vacancy because the conveying operations are arranged in the order of higher priority.

6. The conveying contrivances can be effectively used by changing the route in dealing with disturbance and by reducing the conveying time period.

7. An overall optimum conveying plan can be formed by suitably setting the valuation relation between the starting times of the conveying operations and the conveying time periods.

The above and other objects, features and advantages of the present invention will become more apparent from the following detailed description of a preferred embodiment of the present invention when taken in conjunction with the accompanying drawings, in which:

FIG. 5 is a block diagram of a control arrangement for altering the conveyance plan;

Figure 1:
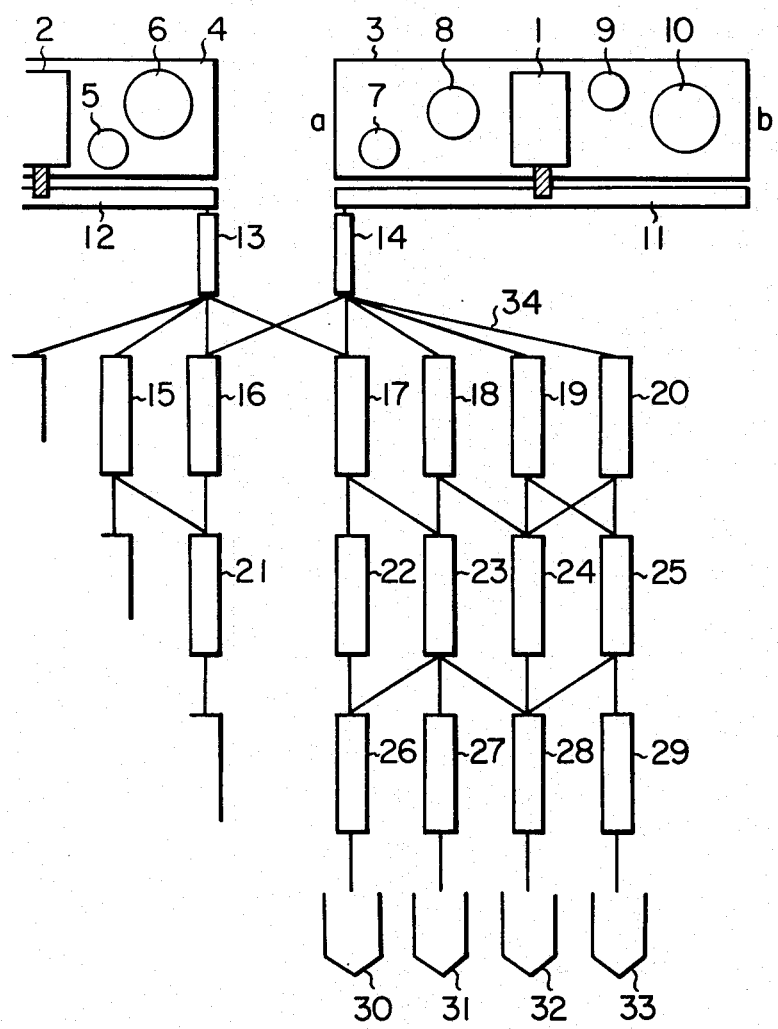
FIG. 1 is a schematic diagram of a system performing the method according to the present invention as applied to a raw-material year in an ironworks.

For a better understanding of the present invention a description will first be made of a conveyor system at a raw-material yard in an ironworks referring to FIG. 1 by way of example only.

Feeders 1 and 2 are movably provided above primary warehouses 3 and 4 for storing materials or stocks 5 to 10 of different kinds such as iron ores and coals to carry the stocks from the warehouses 3 and 4 to conveying contrivances 11 to 29 such belt conveyor which in turn convey the stocks 5 to 10 to storehouses 30 to 33. The conveying contrivances 15 to 29 are arranged in networks and lines interconnecting them, for example the line 34 interconnecting the conveying contrivances 14 and 20 indicates the communication channel therebetween. The storehouses 30 to 33 deliver from their bottom parts a constant amount of stocks (the iron ores, coals, and the like) per unit time to a blast furnace (not shown).

Consider now that the stock 7 is to be conveyed to the storehouse 30. Then, in the case of FIG. 1, there are the following three conveying routes:

```
1 - 11 - 14 - 17 - 22 - 26 - 30
1 - 11 - 14 - 17 - 23 - 26 - 30
1 - 11 - 14 - 18 - 23 - 26 - 30
```

Since the route 1 – 11 – 14 – 17 – 22 – 26 which conveys the stock 7 to the storehouse 30 and the route 2 – 12 – 13 – 17 – 23 – 27 which conveys the stock 6 to the storehouse 31 include the conveying contrivance 17 in common, both conveying operations cannot be performed simultaneously. In other words, they are in competing or conflicting relationship.

Since the storehouses 30 to 33 are delivering from their bottom parts the stocks at a constant rate, if the conveying operation of the stocks from the primary warehouses 3 and 4 to the storehouses 30 to 33 are stopped, the storehouses 30 to 33 become vacant of stocks. Since the storehouses 30 to 33 have the buffer function for conveying the stocks to the blast furnace, they are never allowed to become vacant of stocks. Consequently, planning conveying operation must be made in such a manner that the storehouses never become vacant of stocks by considering the conflicting condition of conveying routes.

Figure 2:
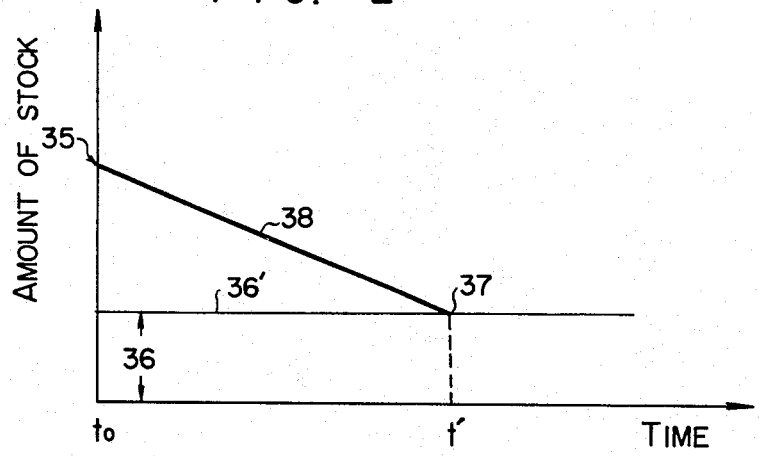
FIG. 2 is a graph of the relation between the amount of stock in a storehouse and the time.
Figure 3:
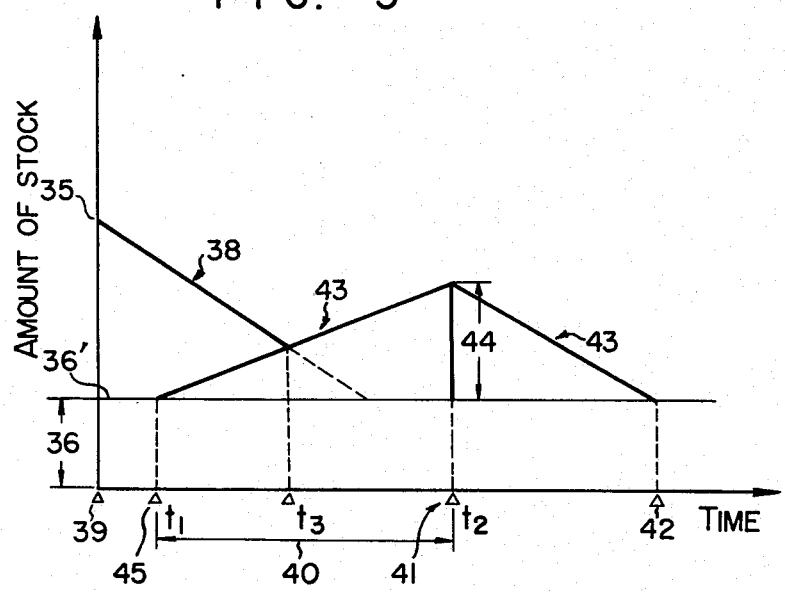
FIG. 3 is a graph for calculating the necessary amount of stock in the storehouse for preparation for routine inspection of a conveyor system.
Figure 4:
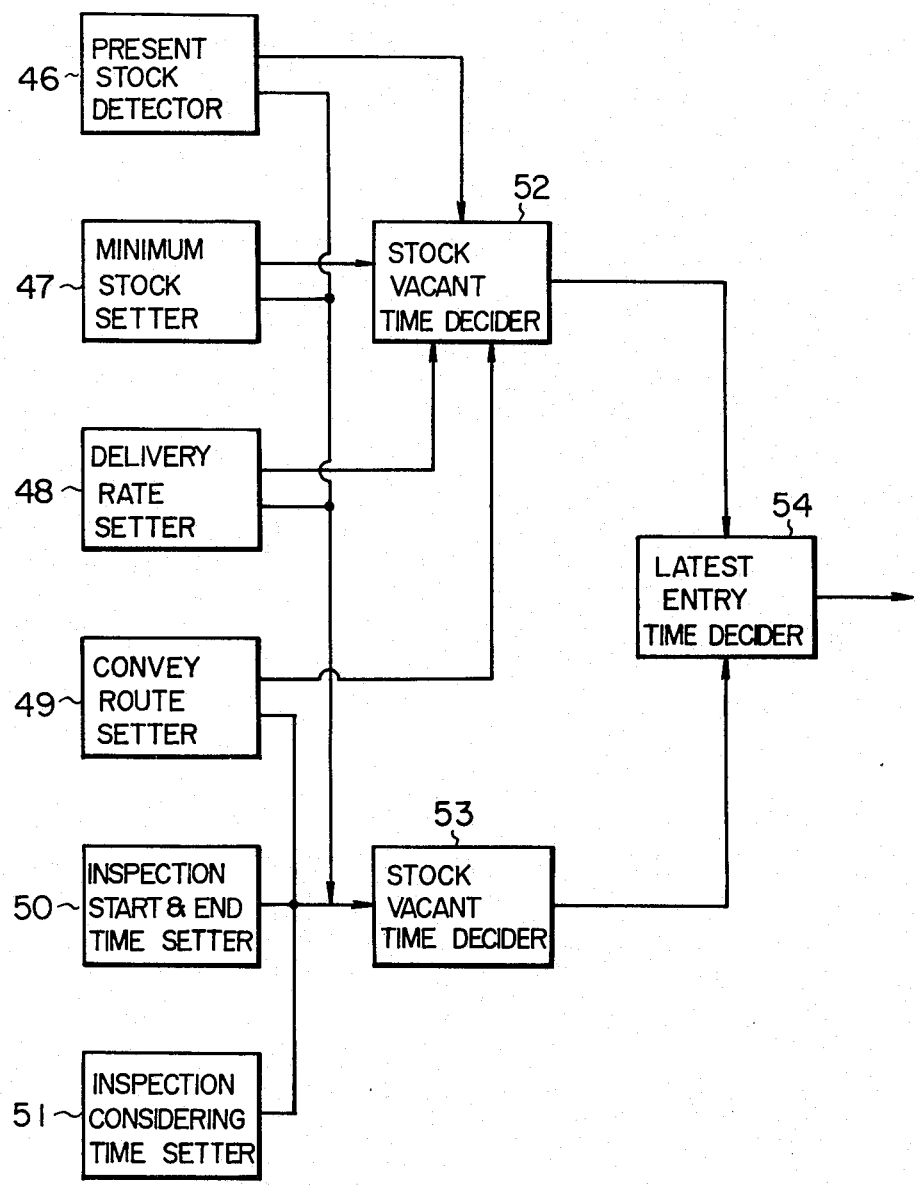
FIG. 4 is a block diagram of an apparatus for performing the calculation of FIG. 3.

FIGS. 2 and 4 relate to the setting of the latest carrying-in or entry time for the storehouses 30 to 33 in order that the storehouses 30 to 33 never become vacant of stocks. FIGS. 2 and 3 are explanations of calculating the latest carrying-in time when the periodical survey or routine inspection of the conveying contrivances is absent and present, respectively. FIG. 4 is a control system for performing the calculation.

In FIG. 2 a stock consumption line 38 with no further entry, that is, the amount of stock at an arbitrary time $t$ is expressed by $h - \beta t$, where $h$ is the amount of stock at the present time $t_o$ designated by reference numeral 35, and $\beta$ is the delivery rate. Reference numeral 36' designates a marginal line of a minimum amount of stock 36. If the amount of stock decreases to less than the minimum amount of stock 36, there is the danger that the storehouse would become vacant of stock. Consequently, the entry of stock in the storehouse must be resumed before the amount of stock in the storehouse reaches the marginal line 36' or the minimum amount of stock 36. Consequently, the intersection 37 of the stock consumption line 38 and the marginal line 36' is the latest entry time $t'$ when the conveying route is not subjected to routine inspection.

When the conveying route is subjected to routine inspection, care must be taken that the amount of stock is not reduced below the minimum amount of stock even when the entry operation of stock is not carried out during the routine inspection. For this purpose, the amount of stock in the storehouses must be increased by the amount consumed during the routine inspection. A method of calculation therefor will be described with reference to FIG. 3.

In order to start a routine inspection at a time $41(t_2)$ and preserve the amount of stock of the storehouse not less than the minimum amount of stock 36, it is necessary to take the amount of stock at the routine inspection starting time 41 ($t_2$) to be the sum of the minimum amount of stock 36 and the consumed amount of stock 41 during the period of routine inspection from $t_2$ to $t_4$.

For this purpose, any preparation for routine inspection is performed at a time 45 ($t_1$) (hereafter referred as routine inspection consideration start time) which preceeds by a routine inspection consideration time 40 ($t_2 - t_1$) to the routine inspection starting time 41 ($t_2$).

The allowable amount of stock 43 between said times 45 ($=t_1$) and 41 ($=t_2$) (where $t_1 < t_2$) is expressed by $$\left\{ f(t_2) - f(t_1) \right\} \times \frac{t - t_1}{t_2 - t_1} + f(t_1)$$

where $f(t_1)$ and $f(t_2)$ are the allowable amounts of stock at the time $t_1$ and $t_2$. By defining the time $t_3$ corresponding to the intersection of the line expressed by the just described formula and the stock consumption line 38 as the latest entry time, the amount of stock of all the storehouses associated with the conveying route which is subjected to routine inspection can be increased by the amount sufficient to provide for the amount of stock consumed during the routine inspection. Reference numeral 39 in FIG. 3 designates the present time at which the plan for conveyance is formed.

The longer the routine inspection considering time period is, the increase in the amount of stock for the routine inspection can be achieved in the longer time. In other words, the increase can be achieved without having a grave influence on the conveyor system. If the routine inspection considering time period 40 is made extremely short, the amount of stock in some storehouse is reduced to less than the allowable amount of stock because of the necessity that the amount of stock of all the storehouses associated with the route to be subjected to routine inspection must be increased in a short time, and in an extreme case the amount of stock becomes less than the minimum amount of stock to result in the danger to aggravate the situation.

A control system to carry out the above described calculation is shown in FIG. 4. A stock vacant time decision device 52 receives outputs of a present stock amount detecting device 46, a minimum stock amount setting device 47, a delivery rate setting device 48, and a convey route setting device 49 to calculate the stock vacant time of the storehouses associated with the conveying route which is to be subjected to no routine inspection in accordance with the method described with reference to FIG. 2. A stock vacant time decision device 53 receives outputs from the devices 46 to 49, a routine inspection start and end time setting device 50, and an inspection considering time setting device 51 to calculate the stock vacant time of the storehouses associated with the conveying route which is to be subjected to routine inspection in accordance with the method described with reference to FIG. 3. A latest entry time decision device 54 receives outputs of the stock vacant time decision devices 52 and 53 to decide the latest entry time of the entry or carrying-in operation for the storehouses associated with the conveying routes which are to be and not to be subjected to routine inspection, respectively.

A control system for changing the order or sequence of consideration of conveying operation will next be described referring to FIGS. 5 and 6. In FIG. 5 reference numeral 54 designates one or more latest entry time decision devices, reference numeral 55 designates a conveying operation considering order decision device for arranging stock or articles in sequence from the earliest one of the latest entry times by the outputs of the latest entry time decision devices 54, and reference numeral 56 designates a latest entry time difference calculating device for calculating the difference between adjacent two latest entry times in the sequence determined by the conveying operation considering order decision device 55, for example for calculating the difference between the latest entry time 62 of the first conveying operation and the latest entry time 63 of the second conveying operation in FIG. 6. Reference numeral 57 designates a comparator for comparing whether or not the difference in the latest entry time is smaller than a constant value $\epsilon$ in FIG. 6. If the difference between the latest entry time of the first conveying operation and the second conveying operation is larger than $\epsilon$, the change in the convey considering order which will be described hereinbelow is not made. If the difference is smaller than $\epsilon$, the delivery rates of the two conveying operations are compared by a delivery rate comparator 58. When the delivery rate A of the conveying operation of the faster one of the latest delivery times is smaller than the delivery rate B of the conveying operation of the later one of the latest delivery times, the considering sequence of the conveying operation is changed by a considering order changing device 59. To the contrary, if the delivery rate A is larger than the delivery rate B, the considering sequence of the conveying operation is not changed.

Figure 6:
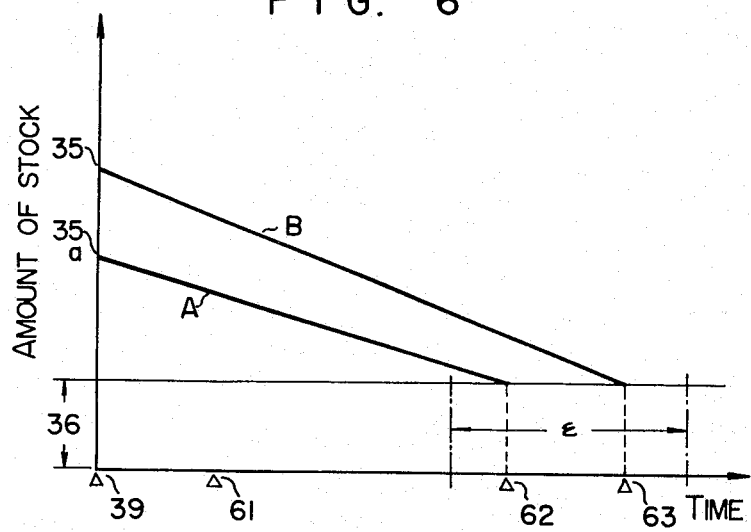
FIG. 6 is a graph of the relation between the amount of stock and the time for understanding of the operation of the arrangement of FIG. 5.

In FIG. 6, since the difference between the latest entry time 62 of the first conveying operation and the latest entry time 63 of the second conveying operation is within the constant value $\epsilon$, and since the delivery rate of the second conveying operation is larger than that of the first conveying operation, the considering order of the conveying operation is changed to the sequence of the second conveying operation B and the first conveying operation A. Consequently, the output signal 59' of the considering order changing device 59 is a modified new sequence signal.

In the above case, the sequence of operations of decision, calculation, comparison, and change are performed each time adjacent two latest entry times are derived successively in the sequence determined by the conveying operation considering order decision device 55.

Generally, the order of allotting the conveying time to each conveying operation is the time sequence of the latest entry times. However, as in FIG. 6 for example, if the conveying time of the first conveying operation is allotted to the conveyance plan and the memory device prior to the second conveying operation, it is difficult to ensure the conveying time duration which catches the latest entry time because the second conveying operation is large in the delivery rate. For this reason, when the difference between the two latest entry times is less than the constant value $\epsilon$, the conveying operation considering order is changed so that the considering order of the second conveying operation comes before that of the first conveying operation.

Figure 7:
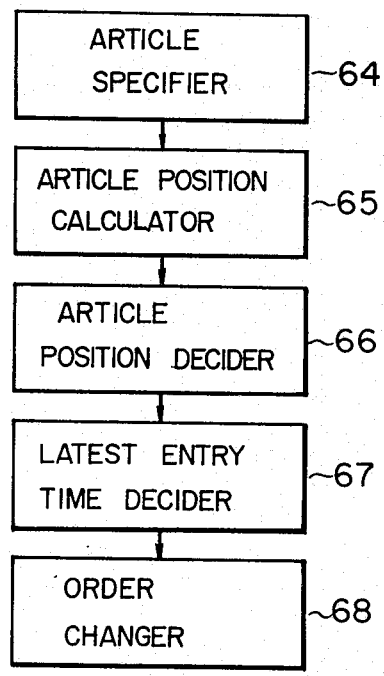
FIG. 7 is a block diagram of a control system for changing the plan of carrying out the stock from a primary warehouse.

Next, a control system for changing the considering sequence of the conveying operations will be described referring to FIGS. 7 and 8. An article specifying device 64 specifies the kind of article in accordance with the previously set latest entry sequence. Since the articles are classified and stored in a number of respective primary warehouses, only one kind of article stored in one primary warehouse is specified. An article position calculator 65 determines the positions $P_1$, $P_2$, and $P_3$ in the primary warehouses of the kinds $A_1$, $A_2$, and $A_3$ of articles specified by the articles specifying device 64 as shown in FIG. 8, and then an article position deciding device 66 decides the positions of the kinds of articles $A_1$, $A_2$, and $A_3$.

In carrying out articles from the primary warehouse in the time sequence of the latest entry order, the position of the kind of article to be carried out next to the kind of article being carried out at present is always considered. For example, in the case of (a) in FIG. 8, it is a rule from the latest entry sequence to take out articles in the order $A_1 - A_2 - A_3$, but when the articles are arranged as shown, the order to take out the articles $A_2$ and $A_3$ is sometimes changed by an order changing device 68. However, if the latest entry time sequence at (a) in FIG. 8 is such that the article $A_3$ is to be taken out earlier, it is unnecessary to supply a signal to the order changing device 68 because it is a rule to take out in that order.

Figure 8:
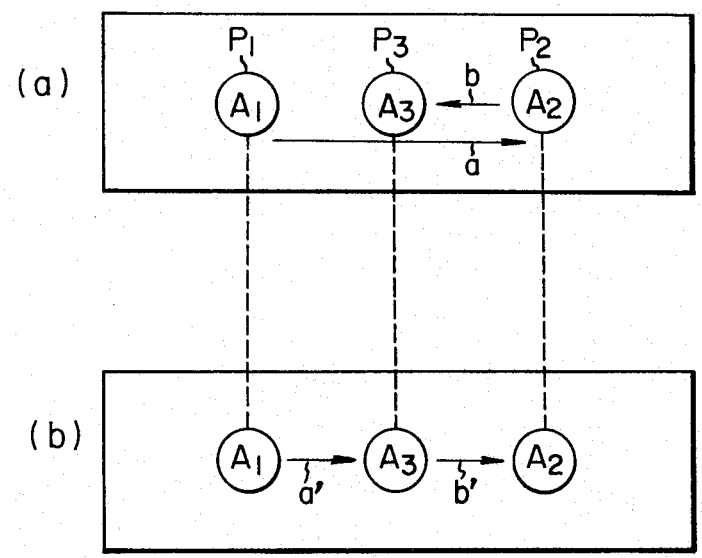
FIG. 8 is a diagram for explaining the system of FIG. 7.

If it is assumed that such a positional relationship as at (a) in FIG. 8 is decided by the article position deciding device 66, whether or not it is reasonable to change the order of the articles $A_2$ and $A_3$ is decided by a latest entry time deciding device 67. Though whether it is reasonable or not is decided by the latest entry time, when the latest entry times of the articles $A_2$ and $A_3$ are far apart from each other, the order is changed by seeing only their positions even though the order of the latest entry times would be $A_1 - A_2 - A_3$. However, there is the possibility that while the conveying contrivance is taking out the article $A_3$, the time to take out the article $A_2$ becomes later than the latest entry time. Since the latest entry time of the article $A_2$ is far earlier than that of the article $A_3$, the article $A_2$ must be taken out earlier. The latest entry deciding device 67 is provided for avoiding the above situation. Whether the difference between the latest entry times of the articles $A_2$ and $A_3$ is large or small is decided by comparing it with a predetermined constant value.

The conveying considering order changing device 68 changes the order of conveying operation as to only the articles $A_2$ and $A_3$ which meet the setting condition of the article position deciding device 66 and the latest entry time deciding device 67 as shown at (b) in FIG. 8 for the following reason.

Though the moving time of the conveying contrivance is a useless time during which nothing is done, it occupies a large part of time of the conveying operation. Since the conveying contrivance runs at a constant speed, the reduction of the moving distance results in the reduction of the moving time. In the case of the sequence as shown at (a) in FIG. 8, the moving distance a + b is large, while if the articles A$_2$ and A$_3$ are changed as shown at (b) in FIG. 8, the moving distance a' + b' becomes smaller than the distance a + b. Thus, the useless time is reduced to improve the rate of operation of the entire conveyor system.

Figure 9:
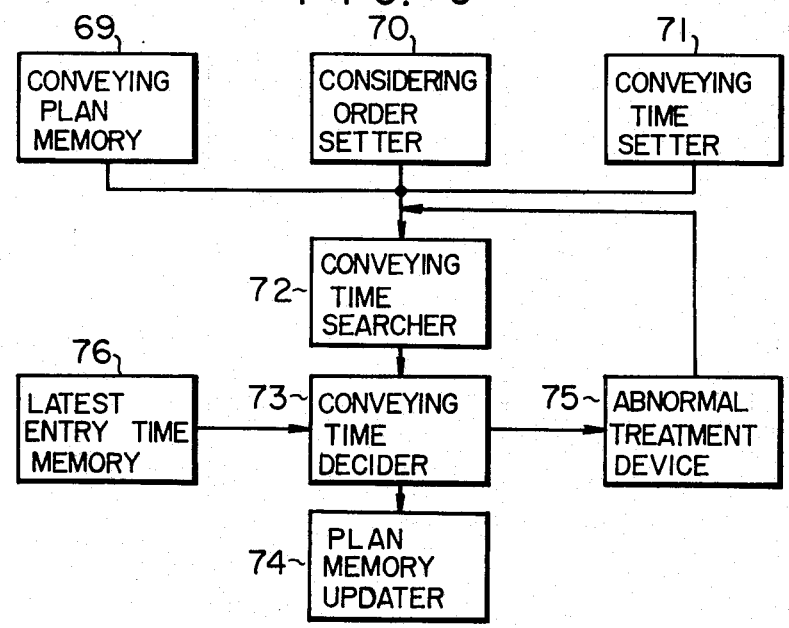
FIG. 9 is a block diagram of a control system for planning conveyance and storing.
Figure 10:
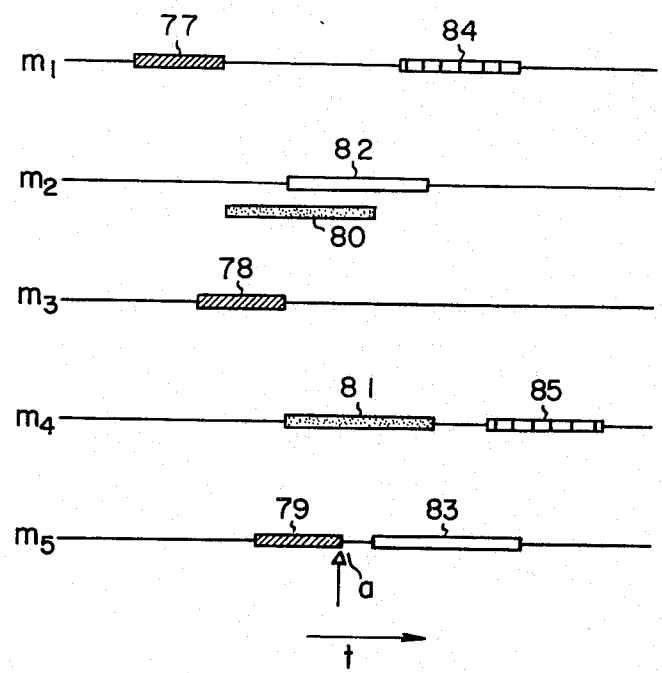
FIG. 10 is a diagram for explaining the function of the system of FIG. 9.

FIG. 9 is a block diagram of a control system of conveying operation, and FIG. 10 is a diagram of explaining the function of the system of FIG. 9.

The sequence of conveying operations is set in a conveying operation considering order setting device 70, and conveying times of conveying operations are set in a conveying time setting device 71. The plan of conveying operations is stored in a conveying plan memory 69 the contents of which is shown in FIG. 10.

For the simplicity of description, it is assumed that these are three conveying operations, and hence three storehouses. It is also assumed that the conveying plans of the first conveying operation (order 1) and the second conveying operation (order 2) are stored in the conveying plan memory 69. Consequently, the problem is to make the plan of the third conveying operation (order 3) and to store it in the memory 69. It is assumed that the first conveying operation employs the route of conveying contrivances $m_1$, $m_3$, and $m_5$, and the second conveying operation employs the route of conveying contrivances $m_1$ and $m_4$.

The lengths of the time zones 77, 78, and 79 during which the first conveying operation employs the conveying contrivances $m_1$, $m_3$, and $m_5$ and the lengths of the time zones 84 and 85 during which the second conveying operation employs the conveying contrivances $m_1$ and $m_4$ are the values set by the conveying time setting device 71. The time lag between the starting times of the time zones 77, 78, and 79, or 84 and 85 is the lag between the times at which articles to be conveyed pass the conveying contrivances. After the lapse of the time interval from the time at which the first conveying operation begins to employ the conveying contrivance $m_1$ to the time the article passes the conveying contrivance $m_1$, the first conveying operation uses the conveying contrivance $m_3$.

It is assumed that the third conveying operation uses the route of the conveying contrivances $m_2$ and $m_5$. Since also the first conveying operation uses the conveying contrivance $m_5$, the using time zones of the conveying contrivances $m_2$ and $m_5$ concerning the third conveying operation become as shown in FIG. 10 at 82 and 83 (it is assumed that for some reason the using time zone 83 cannot be arranged before the using time zone 82). These conveying time zones of the conveying operations are determined by a conveying time searching device 72.

If it is assumed that the latest entry time of the third conveying operation 83 is at a in FIG. 10, the third conveying operation is out of time for the latest entry time. Thus, some abnormal treatment must be made. A latest entry time memory device 76 stores the latest entry times of the conveying operations, and the necessity of the abnormal treatment is decided by an abnormal treatment device 75. When the abnormal treatment is unnecessary, a conveying plan memory updating device 74 stores the using time zones of the conveying contrivances relating to the third conveying operation.

Figure 11:
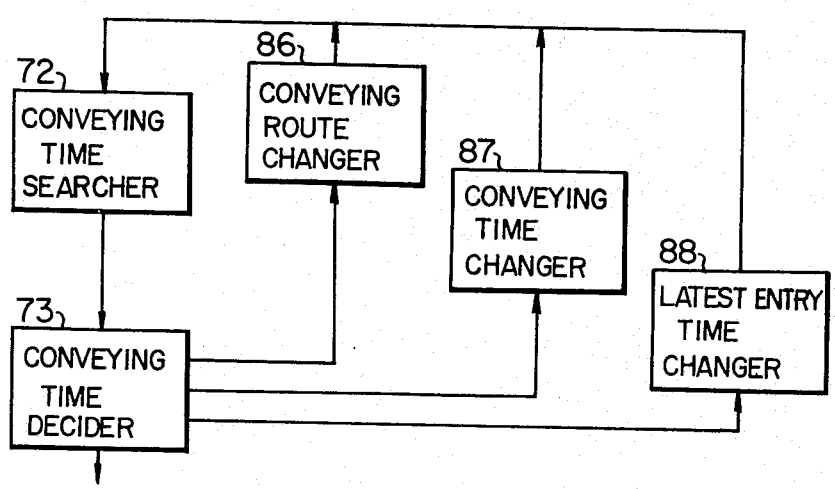
FIG. 11 is a block diagram of a control system for dealing with an abnormal affair.

FIG. 11 is a block diagram of a control system for the abnormal treatment. First, the change of route is considered by a conveying route changing device 86. In FIG. 10, since the latest entry time of the third conveying operation is before the using time zone 83, it is assumed that the route of the third conveying operation is changed from the route of the conveying contrivances $m_2$ and $m_5$ to the route of the conveying contrivances $m_2$ and $m_4$.

In this case, since there is no conflicting relationship between the using time zones 79 and 83 of the conveying contrivance $m_5$, the third conveying operation is carried out at the using time zones 80 and 81. Of course, as can be seen from FIG. 10, the first conveying operation is not subjected to any influence.

Then the conveying operation is out of time for the latest entry time even when the route is changed as above, the conveying time is reduced by a conveying time changing device 87 and the treatment of the conveying time is again carried out by the conveying time searching device 72 and the conveying time deciding device 73. However, in case the conveying operation is out of time for the latest entry time for all these treatments, the latest entry time is changed by a latest entry time changing device 88.

It is a general rule that in changing the conveying route all conceivable routes are to be taken into consideration, and in changing the conveying time it is reduced as short as possible to a possible limit.

Figure 12:
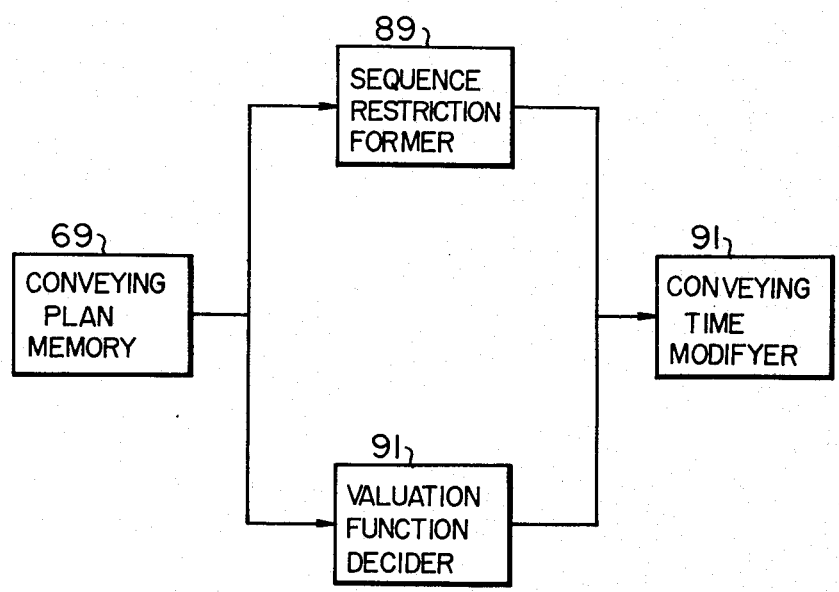
FIG. 12 is a block diagram of a conveyance control system for optimizing the valuation function of the conveyor system.

FIG. 12 is a block diagram of a control system for modifying the starting time of the conveying operation and the conveying time so that a valuation function which is a function of the conveying operation time is optimized while keeping the sequence of the conveying operation determined by the conveying plan memory 69.

The fundamental matter of the above formation of the conveyance plan is to store the conveying times of the conveying operations set in advance in consideration of the conflicting state in the time sequence of the latest entry times (of course, the sequence has been modified by considering the delivery rate of each storehouse and the effective movement of the article carrying device at the primary warehouse).

The sequence restriction of the conveying operation formed by a sequence restriction forming device 89 is to keep the sequence restrictions.

Using time zone 77 < Using time zone 84
Using time zone 81 < Using time zone 85
Using time zone 79 < Using time zone 83 in FIG. 10. In the above formulas, for example Using time zone 77 < Using time zone 84 means that the using time zone 84 starts after the end of the using time zone 77.

The valuation function formed by the valuation function deciding device 90 is a function of the conveying operation starting time and the conveying time. An optimum conveying plan for the entire conveyor system can be formed by optimizing the valuation function while keeping the above restriction conditions, for example.

A conveying operation starting time & conveying time modifying device 91 has the function of determining the conveying operation starting time and the conveying time period which optimize the valuation function while keeping the above restricting conditions.

What is claimed is:

1. A conveyor control system for conveying articles along routes to storehouses having constant delivery rate, comprising: means for detecting the present amount of stock in the storehouses; means for setting a minimum amount of stock in the storehouses; means for setting a stock delivery rate to the storehouses; means for setting a conveying route from a primary warehouse to the storehouses; means for setting a conveying route routine inspection considering time; means for deciding a stock vacant time being supplied with the output from the present stock detecting means, the minimum stock setting means, the delivery rate setting means, and the conveying route setting means; means for deciding routine inspection considered stock vacant time; and means for deciding latest entry time being selectively supplied with the output of the stock vacant time deciding means and the routine inspection considered stock vacant time deciding means, whereby when the conveying route is to be subjected to routine inspection, the output of the routine inspection considered stock vacant time deciding means is supplied to the latest entry time deciding means for a storehouse associated with the conveying route in question, and when there is no routine inspection the output of the stock vacant time deciding means is supplied to the latest entry time deciding means.

2. A conveyor control system according to claim 1 wherein the allowable amount of stock at the routine inspection starting time of the conveying route is taken to be the sum of the minimum amount of stock and the consumed amount of stock of the storehouse associated with the route in question during routine inspection, the minimum amount of stock is taken to be the allowable amount of stock at the time earlier than the routine inspection starting time by the routine inspection considering time period and the allowable amount of stock at the routine inspection end time, the allowable amount of stock at any time $t$ between any two adjacent times $t_1$ and $t_2$, where $t_1 < t_2$, of the said three times is taken to be $$\left\{f(t_2) - f(t_1)\right\} \times \frac{t - t_1}{t_2 - t_1} + f(t_1)$$

where $f(t_1)$ and $f(t_2)$ are the allowable amounts of stock at the two times $t_1$ and $t_2$, and the time $t_3$ corresponding to the intersection of the line represented by the above formula and the stock consumption line represented by $h - \beta t$, where h is the present amount of stock, $\beta$ is the stock delivery rate, and $t$ is any time, is set in the routine inspection considered stock vacant time deciding means for the storehouse associated with the route in question.

3. A conveyor control system according to claim 1, further comprising means for deciding a conveying operation considering order being supplied with the outputs of the latest entry time deciding means; means for calculating the difference between adjacent latest entry times being supplied with output from the conveying operation considering order deciding means and the latest entry time deciding means; means for comparing the difference between adjacent latest entry times being supplied with output from the latest entry time difference calculating means; means for comparing stock delivery rates of conveying operations being supplied with output from the latest entry time difference comparing means; and means for changing the conveying operation considering order to storehouses associated with the conveying routes, whereby when the stock delivery rate for the conveying operation of a later latest entry time is higher than that for an earlier latest entry time, the considering order of conveying operations in the conveying operation considering order deciding means is changed.

4. A conveyor control system according to claim 1, further comprising means for specifying the delivery of articles in accordance with the previously set latest entry time sequence; means for calculating the positions of the articles being supplied with output from the articles specifying means; means for deciding the position of the articles being supplied with output from the article position calculating means and output from the article position deciding means being supplied to the latest entry time deciding means; and means for changing conveying operation considering order being supplied with output from the latest entry time deciding means, whereby when the relation $P_1 < P_2 < P_3$ for the positions $P_1$, $P_2$, and $P_3$ exists in a primary warehouse of the articles for time sequential conveying operations $TS_1$, $TS_2$, and $TS_3$ and when the difference between the latest entry times of the conveying operations $TS_2$ and $TS_3$ is within a constant value, the considering order of the conveying operations $TS_2$ and $TS_3$ is changed.

5. A conveyor control system according to claim 1, further comprising means for memorizing a conveying plan; means for setting a conveying operation considering order; means for setting a conveying time period; means for searching the conveying time being supplied with output from the conveying plan memory means, the considering order setting means and the conveying time setting means; means for memorizing the latest entry times supplied from the latest entry time deciding means; means for deciding conveying time being supplied with output from the latest entry time memory means and the conveying time searching means; means for updating the information supplied to the conveying plans memory means being supplied with output from the conveying time deciding means; and means for abnormal treatment of conveying operations being supplied with output from the conveying time deciding means, whereby whether or not conveying operations set by the conveying operation time period setting means in the conveying operation end within the latest entry times of the conveying operations is decided by the conveying operation time searching means, and if the conveying operations end within the latest entry time the conveying operation is freshly stored in the conveying plan memory updating means and if the conveying operations do not end within the latest entry times an abnormal treatment thereof is effected.

6. A conveyor control system according to claim 5, further comprising means for changing the conveying route being supplied with output from the conveying time deciding means; means for changing the conveying time being supplied with output from the conveying time deciding means; and means for changing the latest entry time being supplied with output from the conveying time deciding means with output from the conveying route changing means, the conveying time changing means and the latest entry time changing means being supplied to the conveying time searching means, whereby when a conveying operation is out of time for its latest entry time even if all conceivable routes subjectable to an abnormal treatment are considered the conveying time period is reduced, and if the conveying operation is still then out of time for its latest entry time even after the reduction the latest entry time is changed so that the conveying operation ends within the latest entry time.

7. A conveyor control system for conveying articles along routes to storehouses having constant delivery rate, comprising means for memorizing a conveying plan; means for forming sequence restriction to conveying operations stored in the conveying plan memory means; means for forming a valuation function from conveying operation starting times and conveying time periods of the conveying operations stored in the conveying plan memory means; and means for modifying the conveying operation starting times and the conveying time periods of the conveying operations such that the valuation function is optimized under the sequence restrictions provided.

8. Method of controlling conveyance of stocks from one or more primary warehouses to storehouses having constant delivery rate, comprising the steps of storing the order and restricting conditions of the conveying operation and the starting time of conveyance in conveying plan memory device; forming a valuation function of the conveyor system from the contents of the memory device; and modifying the conveying system so that the valuation function is optimized and the storehouses to which the stocks are conveyed never become vacant of stocks for any change in the state of conveying routes and conveying devices.

9. Method according to claim 8, further comprising the step of determining the latest entry time by considering the delivery rate, the rate of stock delivery to the storehouses and the time necessary for routine inspection to ensure a sufficient amount of stock to prevent a storehouse from becoming vacant of stock during routine inspection thereof.

* * * * *